United States Patent
Widjaja et al.

(10) Patent No.: US 8,416,486 B2
(45) Date of Patent: Apr. 9, 2013

(54) LIGHT WEIGHT ELECTROCHROMIC MIRROR STACK

(75) Inventors: Edy Widjaja, Singapore (SG); Peter Persoone, Deinze (BE)

(73) Assignee: Saint-Gobain Performance Plastics Chaineux (BE)

( * ) Notice: Subject to any disclaimer, the term of this patent is extended or adjusted under 35 U.S.C. 154(b) by 0 days.

(21) Appl. No.: 12/922,757

(22) PCT Filed: Mar. 9, 2009

(86) PCT No.: PCT/EP2009/052735
§ 371 (c)(1),
(2), (4) Date: Sep. 15, 2010

(87) PCT Pub. No.: WO2009/115424
PCT Pub. Date: Sep. 24, 2009

(65) Prior Publication Data
US 2011/0013254 A1    Jan. 20, 2011

(30) Foreign Application Priority Data
Mar. 17, 2008 (EP) ..................... 08152830

(51) Int. Cl.
*G02F 1/153* (2006.01)
(52) U.S. Cl.
USPC .......................................... 359/273; 359/267

(58) Field of Classification Search .......... 359/265–275; 345/107, 105
See application file for complete search history.

(56) References Cited

U.S. PATENT DOCUMENTS

| | | | |
|---|---|---|---|
| 4,133,152 A | 1/1979 | Penrose | |
| 5,377,037 A * | 12/1994 | Branz et al. | 359/265 |
| 5,673,150 A | 9/1997 | Ono et al. | |
| 6,768,574 B2 | 7/2004 | Bertran Serra et al. | |
| 6,939,446 B2 | 9/2005 | Krisko et al. | |
| 2003/0112489 A1 | 6/2003 | Ash et al. | |

FOREIGN PATENT DOCUMENTS

| | | |
|---|---|---|
| EP | 0652462 B1 | 2/2000 |
| JP | 2005-330148 A | 12/2005 |
| WO | WO 94/15247 A1 | 7/1994 |

* cited by examiner

*Primary Examiner* — Tuyen Tra
(74) *Attorney, Agent, or Firm* — Abel Law Group, LLP; Chi S. Kim

(57) ABSTRACT

A light weight electrochromic dimmable mirror stack (300, 600) is presented that is composed only of solid-state layers (315, 615) with a total thickness of less than 50 micron and a reflector (310, 610). Normally such a kind of layered device suffers from iridescence due to interference of light waves reflecting at the interfaces between the layers of the electrochromic device. The solution provided by the invention is to pattern at least one of the layers (315, 615) in the device such that the interference effects are smeared out and a more neutral color is obtained. Various possible configurations are described and also the method to produce such a device.

31 Claims, 4 Drawing Sheets

LIGHT WEIGHT ELECTROCHROMIC MIRROR STACK

TECHNICAL FIELD

The invention relates to the technical field of electrochromic mirrors used in applications such as rear view mirrors in vehicles.

BACKGROUND ART

The reflectivity of an electrochromic mirror device can be varied by applying a voltage over the device. This makes them ideal for use in rear view mirrors of vehicles. They solve the danger problem that the vehicle driver gets temporarily blinded after having looked into the reflected headlights of the vehicles trailing behind him. Already many different systems exist but the constant behind these electrochromic devices is that there occurs a change in transparency in a material layer due to the reduction or oxidation of an ionic species that is displaced under the action of an electric field. The ionic species can be a proton, or a lithium ion or—in rare cases—sodium or potassium ions.

The existing systems differ in the kind of electrochromic layers that are used. The electrochromic layer is the layer that changes transparency when the ionic species are extracted or incorporated into the layer. Electrochromic materials exist that e.g. become darker when the ionic species gets into the layer. Tungsten oxide for example will darken when lithium ions are incorporated and reduced into its lattice (colouring on reduction or cathodically colouring). Nickel oxide will darken when lithium atoms are expelled out of the network as ions (colouring on oxidation or anodically colouring). Although the electrochromic material is generally a solid it can be incorporated in a polymeric matrix. By combining a cathodically with an anodically colouring layer the absorptive effect of both is added. Both layers are preferably separated by an ion conductive but electron resistive layer, usually referred to as the ion conductor.

This ion conductor is another variant in the design of the electrochromic mirror: it can be liquid or solid, or it can be a liquid held in a solid or gel matrix. It can be based on inorganic materials as well as on organic materials.

For the purpose of this application, only all solid-state electrochromic mirror devices are considered. The all solid state layers of such device can conveniently be deposited in vacuum coating installations, one layer after the other. All solid state layers are most stable compared to their gel or liquid counterparts. The layers can be made very thin and hence can be made very light. One can therefore make such electrochromic stacks on a light flexible substrate such as a reflective metal substrate and attach them to a convenient carrier such as a—possibly curved—glass pane. Such an assembly is much lighter than the known assemblies wherein the layers are held between at least two glass panes, considerable adding to the weight of the mirror. As a consequence, the higher weight results in a lower frequency of vibration of mirrors that causes a blurred rearview.

However, because the thicknesses of the layers in the electrochromic stack come close to the visible wavelength, the reflection at the different interfaces leads to interference of the light rays. This results in a distorted colour of the reflected image that moreover depends on the angle under which the rays are reflected (sometimes called iridescence). Such a situation is very prominent when the mirror is in the bleached state. A too much distorted colour will lead to confusion for the driver and is not acceptable (see e.g. EU Directive 2003/97/EC, section 3.5 of Annex 2). This problem does not occur for systems that use polymer or liquid electrochromic layers as there the thickness of at least one of the layers of the device covers several wavelengths which leads to a loss in coherence and hence no interference is observed. Typically the thickness of this kind of systems is 100 to 150 micrometer (see e.g. US 2003/0112489).

U.S. Pat. No. 5,673,150 (equivalent to EP 0652462) describes for example such an all solid state electrochromic stack for use in an anti-glare mirror. The stack comprises an indium tin oxide (ITO) transparent conductive layer, an iridium oxide layer ($IrO_x$) as an anodically colouring electrochromic layer, tantalum oxide ($Ta_2O_5$) as an ion conductor and tungsten oxide ($WO_3$) as a cathodically colouring electrochromic layer. The ionic species is the hydrogen ion ($H^+$). The disclosure addresses the problem of the interference at the interfaces at the layers and solves this by introducing a tin oxide layer ($SnO_2$) between the iridium oxide and the tantalum oxide layer. Although the problem seems to be alleviated, it appears not to be completely gone as the reflectorgrams in the disclosure still shows prominent peaks and valleys.

U.S. Pat. No. 6,768,574 likewise discloses an all solid state rear view mirror for use in vehicles comprising all solid state layers of the type mentioned above but wherein at least one of the layers is 'nanostructured', the term being defined as: (a) having a structure with a crystalline order of nanometric range (domains between 2 to 20 nm), (b) having crystalline domains of nanometric dimensions (1 to 20 nm) embedded in an amorphous matrix of the same or a different compound or, (c) having a structure formed by multiple layers of nanometric thickness (2 to 100 nm). The embodiments show alternative materials with vanadium oxide ($V_2O_5$) in stead of iridium oxide and silicon carbide (SiC) as ion conductive layer in stead of tantalum oxide. In one of the embodiments the ion conductor layer (SiC) is an amorphous layer wherein crystallite SiC nanometric (2 to 3 nm in diameter) spherical particles are embedded. The nanostructuring is claimed to lead to a reduced electronic conductivity and a better ion retention, leading to higher switching speeds. No mention is made of an interference problem between the different layers.

WO 94/15247 describes a transparent electrochromic device wherein optical tuning layers are provided to enhance the transmission of the device and thereby reduce the iridescence when in the bleached state.

Japanese abstract JP 2005 330148 describes an anti-fogging element comprising a stack of layers with specified optical thicknesses to one another and a porous hydrophilic layer on top to prevent that fog would deteriorate the vision of the—possibly electrochromic—mirror.

DISCLOSURE OF INVENTION

The object of the invention is therefore to provide a rear view mirror that does not suffer from the interference that leads to iridescence. Moreover, the inventive mirror is light in weight, can be produced on foil which allows for bending and gluing on a not flat surface. Furthermore, it is an object of the invention to provide a method to make such a mirror.

According a first aspect an electrochromic mirror stack is provided comprising a reflective surface and a layered electrochromic device parallel therewith. The electrochromic device comprises an ion conductor layer, contacted with two electrochromic layers adjacent to the ion conductor. Further one or two transparent conductive oxide layers are provided in contact with either one or both of said electrochromic layers. In case only one transparent conductive layer is present the reflective surface can take over the role as current collector in order to obtain a functional stack. The mirror stack may further comprise an optical layer i.e. a layer that is optically transparent and has certain structural features explained below.

A mirror comprising the mirror stack is further completed with for example contact leads in order to supply an electric field over the stacks, an isolation layer in order to isolate the stack from atmospheric circumstances, a carrier glass for gluing the stack to and a housing for fixing the mirror to the vehicle.

The reflective surface can be provided in a number of ways. One exemplary way is to build the device on a reflective surface such as one side of a thin metal foil of stainless steel, possibly coated with a high reflective metal layer such as aluminium or silver. Alternatively an alloy can be used that can contain a corrosion resistant metal such as chromium in order to protect the mirror form possible degradation by corrosion or oxidation. Or the reflective surface can be provided in the form of a highly reflective metal film on a suitable substrate such as a glass pane or polymer film that is not necessarily transparent.

Another preferred example of providing the reflective surface is to first build the electrochromic stack with the optional layer on a transparent substrate such as a glass pane or a highly transparent polymer (polycarbonate (PC) or polymethylmethacrylate (PMMA)) and to conclude with the deposition of a highly reflecting layer.

The ion conductor is an essential part of the inventive mirror stack. It is a compound out of the group formed by oxides, nitrides, oxy nitrides and carbides of silicon, fluorides, oxides and nitrides of semi-metals, and combinations of at least two of the foregoing. Preferred examples are the binary compounds silicon dioxide ($SiO_2$), silicon oxide (SiO), silicon carbide (SiC), tantalum oxide ($Ta_2O_5$), aluminium oxide ($Al_2O_3$), silicon nitride ($Si_3N_4$), magnesium fluoride ($MgF_2$), zirconium oxide ($Zr_2O_3$). These binary compounds must later be loaded with the ionic species being $H^+$ or an alkalimetal ion of which $Li^+$ is the most preferred.

Alternatively, ternary compounds containing lithium can be used for the ion conductor such as lithium phosphate, lithium phosphorus oxynitride, lithium niobate, lithium silicate, lithium aluminum silicate, lithium silicon oxynitride, and lithium silicon phosphorus oxynitride, lithium aluminum fluoride, lithium nickel manganese oxide, lithium nickel cobalt manganese oxide, lithium nickel cobalt oxide, lithium vanadium oxide, lithium iron phosphate, lithium vanadium phosphate, lithium cobalt vanadium oxide, lithium titanium oxide, lithium silicon tin oxynitride. By adjusting the electrochromic electrode composition, it is possible to eliminate the separate charging step that otherwise would be needed (see further).

The ion conductor is sandwiched between two electrochromic electrodes. Typically these materials are transition metal oxides. Preferred materials for the electrochromic materials are: tungsten oxide (cathodically colouring), nickel oxide (anodically colouring), molybdenum oxide, niobium oxide, tungsten tantalum oxide, nickel tantalum oxide, nickel tungsten oxide (anodically colouring) or alloys thereof. Specifically $WO_3$ is used as an electrochromic electrode It should be noted that the electrochromic effect of one of the electrochromic electrodes does not have to be specifically in the visual region of the spectrum. Indeed, one of the electrochromic layers could act as an ion store for storing the ions that have been extracted from the opposite electrode with a negligible effect on the visual transparency. Transparent compounds which are known for this are for example vanadium oxide ($V_2O_5$) and titanium oxide ($TiO_2$).

By making the transition metal oxide of the electrochromic compounds super stoichiometric in oxygen, an additional lithiation step—in case lithium is used as ion species—can be eliminated as described in the pending application PCT/EP2007/061710 of the same applicant.

The one or two transparent conductive layers that complete the electrochromic stack are needed for establishing an electric field over the device. These conductive layers are usually provided in the form of Transparent Conductive Oxides (TCO's). Most well known are indium tin oxide (ITO) or aluminium zinc oxide (ZOA) and the variations thereon such as fluoride doped tinoxide (FTO). As mentioned before one of the transparent conductive layers can be eliminated if the reflective surface can function as a contact. If a—normally electrically insulating—optical layer is present between the electrochromic device and the reflecting surface, two transparent conductive oxides are needed.

The electrochromic device as described can be switched between a dark and a bleached state by applying an electric field, but it can also be held at any intermediate state in between those two extremes by steering e.g. the electric current. The transparency of the electrochromic stack—and hence the reflectivity of the mirror stack—can thus be varied at will.

If present, the optical layer can be either placed between the reflective surface and the electrochromic device or on top of the electrochromic device, opposite to the side where the reflective surface is. The optical layer is substantially transparent. It could have other functions such as scratch resistance, self cleaning or permanent coloring of the mirror, but these are subordinate to the function of the layer which will be described later on.

The mirror stack is inventive through the feature that at least one (or more) of the cited layers (the ion conductor, the electrochromic, the transparent conductive or the optional optical layer) is patterned with feature sizes along the principal axes somewhere between 1 and 950 micron. The principal axes are the axes that are perpendicular to the local normal of the reflective surface i.e. in the plane perpendicular to that normal.

In case the pattern is repetitive, the axes follow the main directions of the pattern (hence are not necessarily orthogonal to one another) and the feature sizes are the repetition distances of the pattern along each axis.

When no repetitive pattern is present, the principle axes are considered as substantially orthogonal to one another. The feature sizes are then the average sizes of the pattern as they can be measured along the orthogonal axes and can be used as a measure of the pattern.

The feature sizes are between 1 to 950 micron, more preferred between 1 to 500 micron, most preferred between 10 and 200 micron. This is the kind of feature size the human eye is not longer able to resolve from a reading distance (like e.g. the pixels of a computer screen). Smaller than 1 micron is not preferred because other processes come into play then.

The patterning is in the total local optical length along the normal to the reflective surface. The optical length (OL) of a single uniform layer is well known to the person skilled in the art as the thickness 'd' of that layer multiplied by its refractive index 'n': $OL = n \times d$. The optical length must be considered on a point-by-point basis i.e. must be considered local as it is this feature that varies over the mirror stack. Hence, with local is meant on a scale much smaller than that of pattern feature size. The total local optical length $OL_{total}$ must be considered so that different layers do not balance out the one against the other:

$$OL_{total} = \sum_i n_i \times d_i$$

Only a single direction is considered (i.e. only incident or only reflected wave). Although the physical theory of optical layered stacks (e.g. as described in H. A. MacLeod, Thin Film Optical Filters, Institute of Physics Publishing (2001)) gives much more precise estimates for the optical length of a stack, the definition given here of the total optical length is sufficient for the purposes of this application given the fact that either the layers have approximately a refractive index of about two or are too small to have a large influence.

When now a reflectogram is taken from such a mirror stack with a patterned layer over a spot that is substantially larger than the feature size, the interference peaks will average out over the spot and no disturbing iridescence is observed in the mirror even not when looking under oblique angle. The interference is reduced to the extent that when scanning the wavelength from 450 nm to 650 nm, the local minimum that follows after a local maximum will be less than 15% even less than 10% lower in reflectance. Of course this reflectogram must be taken with the electrochromic device in the bleached state because in the darkened state, the reflectogram is scaled down due to the much increased absorption and the differences between peaks and valleys is on itself already much reduced.

The design wavelength is usually taken around 550 nanometer which is in the green part of the spectrum that is best discerned by the human eye. However, other design wavelengths such as 520, or 600 nanometer could be used equally well.

The maximal total local optical length of the layers is preferably lower than 100 micrometer, preferably lower than 50 micron and even more preferred lower than 10 micrometer. As the refractive index of the materials used is predominantly around 2, the total physical thickness of the stack is lower than 50 or 25 or even lower than 5 micron. The physical thickness of each of the individual layers is thinner than 3 micron, preferably thinner than 1 micron although thinner than 500 nm is also possible depending on the layer. Some of the layers can be very thin: an ion conductor of for example $SiO_2$ can still function below 10 nm. When on the other hand lithium oxy nitride (LiPON) is used as ion conductor, the thickness will be in the range 1 to 2 micron. Other layers must be thicker: the TCO layer e.g. is typically around 200 nm, the electrochromic layers are between 100 to 500 nm thick.

The averaging out of the interference only occurs if the range of the variation (not the total thickness) in the optical length of the pattern is of the order of 1 to 15 times although 1 to 5 times the quarter of the design wavelength is also acceptable. The range is defined as the difference between the maximum and the minimum value in local optical length as measured over a substantial number of feature sizes. In principle the interference will cancel out when the extremes in variation are an odd multiple apart but as many wavelengths have to be covered some even multiples of the quarter of the design wavelength will correspond to odd multiples for neighbouring wavelengths.

A first way of varying the total optical length is to vary the thickness (not the refractive index) of one or more of the layers over the length scales of the feature size by means of an adapted deposition method. Even if only one layer is varied, there will already be a positive effect. Alternatively, the variation in optical length can be incorporated in the optical layer in case this option is chosen. Typically this layer has a thickness between 50 nm to 1000 nm. The variation can be due to a variation in thickness of the layer. Or the layer can have a uniform thickness but show a variation in refractive index. Or the layer can have a variation in both the refractive index and the thickness. This can for example be achieved by having a change in material composition by depositing microcrystalline material with crystallites larger than 1 micron.

The patterning can be in many ways. For example the patterning may be in a 'random' manner wherein the cells covering the surface are 'never' the same thereby forming Voronoi cells the inner part of which for example have a low total optical thickness and the edges a higher optical thickness. Or the patterning can be done by means of a Penrose tiling—as described in U.S. Pat. No. 4,133,152—that is a tessellation that uses only two building cells, wherein the first building cell could have a 'low' total optical thickness and the second building cell a 'high' total optical thickness. Or there can only be one unit cell that repeats over the whole plane in one of the 17 possible wallpaper groups that cover the plane.

According a second aspect of the invention a method to make the mirror stack is claimed. In its broadest form, the method comprises the steps of:
  Providing a reflective surface. This can for example be in the form of a polished metal foil, coated metal foil, coated polymer film or coated glass.
  Depositing on the reflective surface a functional electrochromic stack comprising an ion conductor, one or two electrochromic layers adjacent to said ion conductor and one or two transparent conductive layers adjacent to said one or two electrochromic layers. It will be clear to the person skilled in the art that this can e.g. be achieved by coating an electrochromic layer on the reflector (which then serves as a first contact), followed by the deposition of the ion conductor, followed (or in case only one electrochromic layer is used, not followed) by the deposition of the second electrochromic layer and finalised by the deposition of a transparent conductive layer acting as a front electrode.
  As an option an optical layer can be deposited on the functional stack, on top of the transparent conductive layer.
At least one of the layers of the functional electrochromic stack or the optional optical layer is patterned in the direction perpendicular to the normal on the reflective surface with feature sizes in the range of 1 micron to 500 micron. All deposited layers are solid state layers and can be effected by means of AC or DC magnetron sputtering, RF sputtering, sol-gel deposition, evaporation or any other known method that is known to result in a solid state layer.

Alternative methods are readily envisaged by changing the order of the depositions. A first alternative is to deposit the optical layer on the provided reflector surface, followed by the deposition of:
  a first transparent conductive layer,
  a first electrochromic layer,
  the ion conductor layer,
  possibly a second electrochromic layer and
  finally a second transparent conductive layer.

Another alternative is to deposit the functional electrochromic stack on a transparent substrate such as a glass or a polymer foil, followed by the optional deposition of the optical layer and finish the stack with the deposition of a reflector layer of e.g. aluminium or another highly reflecting metal alloy. The order of deposition on the transparent substrate is then e.g. transparent conductive layer, first electrochromic material, ion conductor, second electrochromic material, (in option: second transparent conductive layer, followed by optical layer), finishing with the deposition of the reflector that (in case the option is not followed) is used as a second electrode. As a last alternative, the optical layer can be deposited on the transparent substrate, followed by the deposition of the functional electrochromic stack.

The patterning itself can be done either by an additive method or a subtractive method.

Additive methods are e.g. deposition through a mask with the pattern on it. This can be a purely mechanical mask (through e.g. a mesh of wires), or a fluid based mask (by oil printing e.g. followed by the removal of the oil after deposition) or a photolithographic applied mask. The patterning can also be printed on through transfer printing, ink jet printing or the like. Even deposition by wet coating can be envisaged provided upon drying a patterned solid state layer results.

Alternatively subtractive methods can be used wherein from an already deposited layer material is removed through plasma etching, selective laser ablation or even mechanical scribing.

The method can be applied on discrete substrates in a batch process. Alternatively, the process can be applied in a roll-to-roll process wherein for example the reflective surface is rolled off and coated with the respective layers. The patterning can then be done by for example a belt shaped mask that moves together with the substrate.

BRIEF DESCRIPTION OF FIGURES IN THE DRAWINGS

Figure 5A:
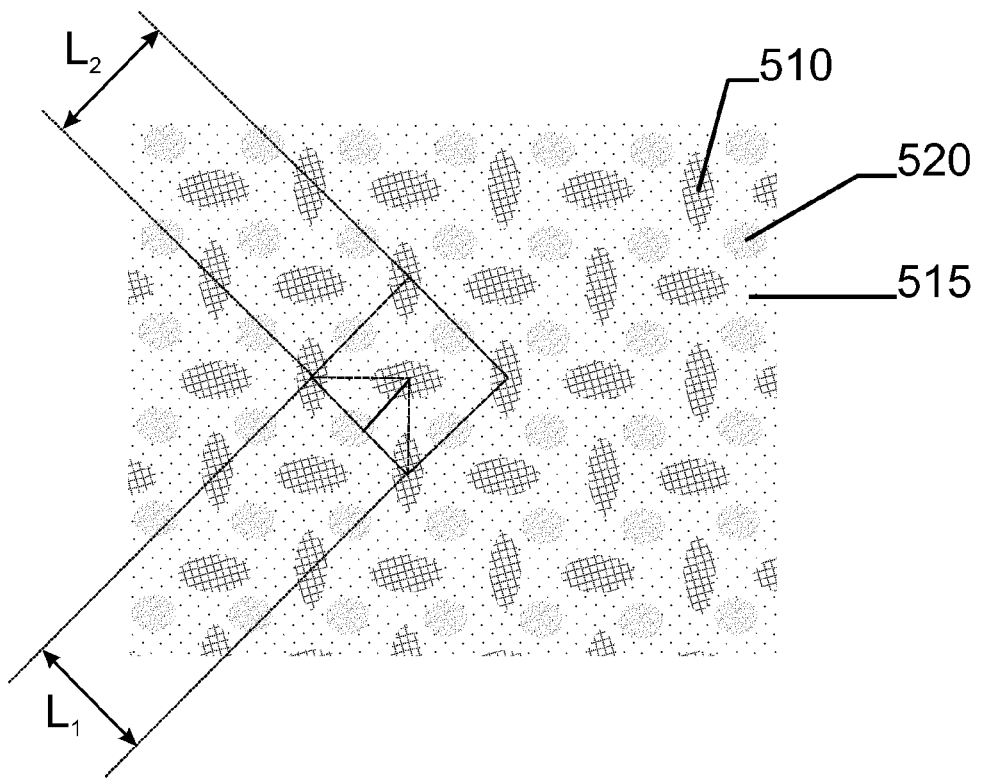

FIGS. 5*a*, *b* and *c* shows different possible patterning

Figure 6:
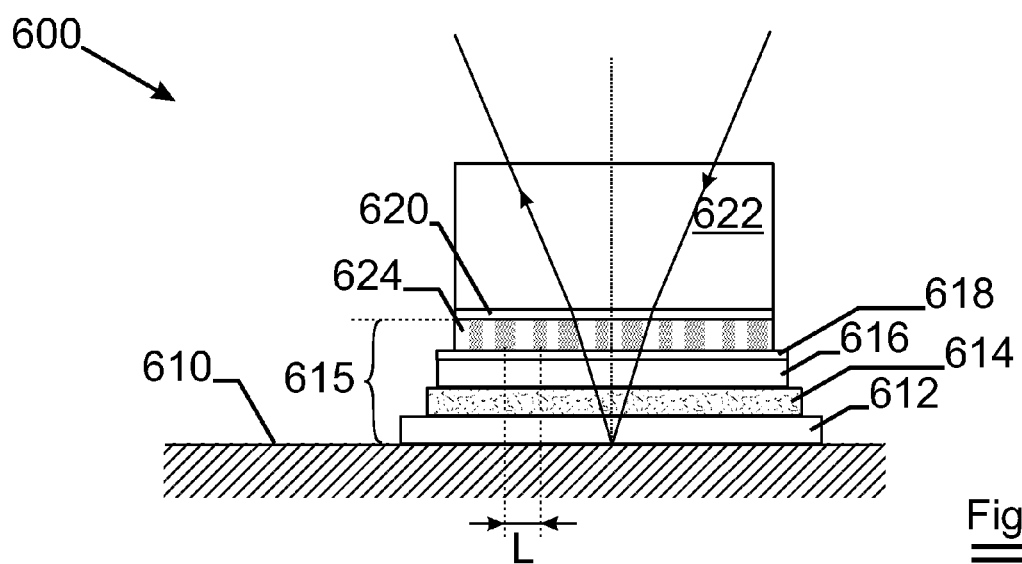

FIG. 6 shows a third embodiment of the inventive stack with an optical layer.

Figure 7:
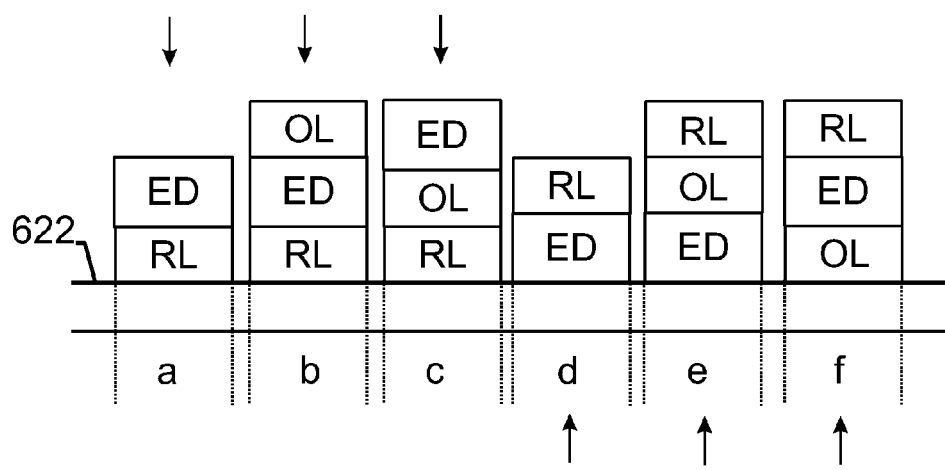

FIG. 7 shows the six possible arrangements for the layered stack.

MODE(S) FOR CARRYING OUT THE INVENTION

Figure 1:
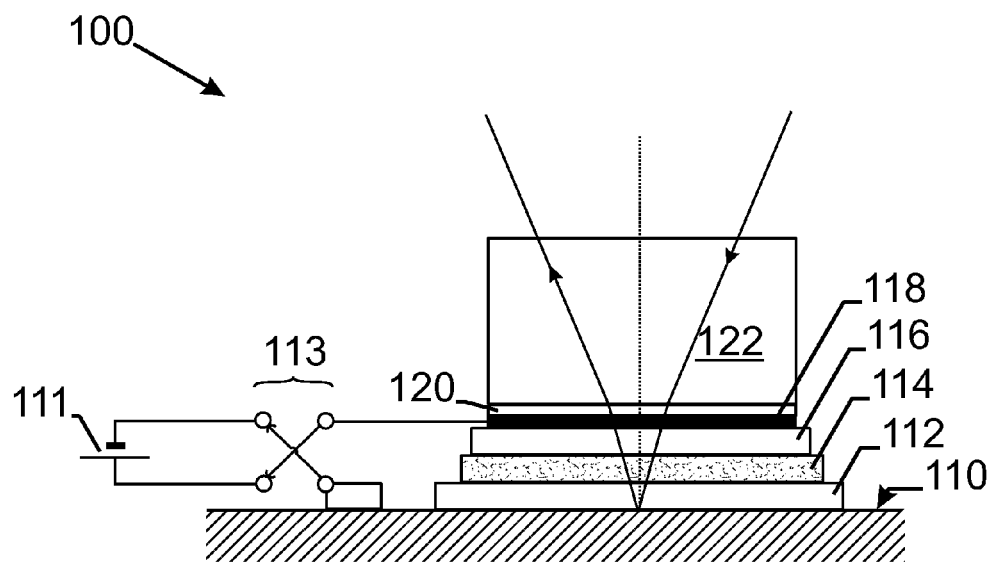
FIG. 1 shows the prior-art device

The prior-art device 100 as exemplary described in FIG. 1, consists of a reflective surface 110 that in this configuration acts as a first conductive layer on which a first electrochromic layer 112 is deposited, followed by an ion conductive layer 114 on which a second electrochromic layer 116 is laid down. The stack is finished with a transparent conductive layer 118. The mirror stack can be glued to a glass pane 122 by means of an adhesive layer 120 of e.g. PVB (polyvinyl butyral). An electric field responsive to the ambient light conditions is supplied through a DC voltage supply 111 can be interrupted or reversed through switch 113 in order to bring the device from a bleached into a darkened state and back.

Figure 2:
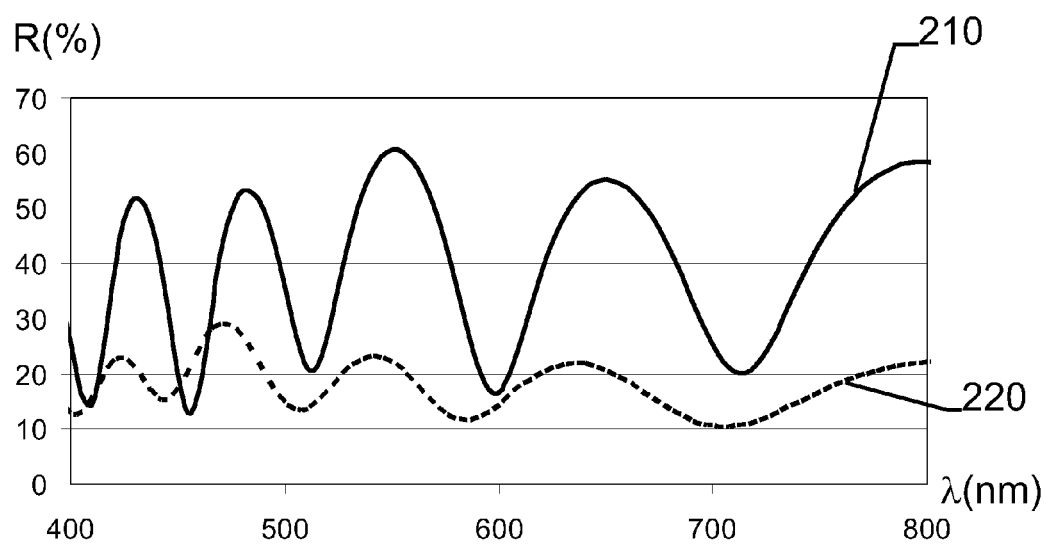
FIG. 2 shows a reflectogram of the prior-art device in the clear and in the bleached state.

The reflectogram of such a mirror stack is depicted in FIG. 2 wherein 220 denotes the reflective curve in the case of the darkened state and 210 the reflectance in case of the bleached state in range wherein the wavelength λ is scanned from 400 to 800 nm. Note that the difference between the local extrema is much higher in the bleached state than in the darkened state. The extreme variations in the clear state are due to light interference at the interfaces and leads to iridescence of the reflective image, making the device not colour neutral. The variations in the darkened state are less problematic as the reflective image is already very dark, and the colours are less pronounced. The measuring spot is about 15 mm in diameter.

The mirror stack was built on a polished stainless steel metal foil on which a tungsten-nickel reflector layer was deposited. A tungsten oxide $WO_3$ layer of about 400 nm thick was DC magnetron sputtered thereon. On top of that a silicon dioxide of 5 to 10 nm thin was deposited as an ion conductor, followed by the reactive sputter deposition of tungsten nickel oxide (W—Ni—O) of 300 nm thick that acts as a complementary electrochromic electrode. The device was finished with a transparent conductive indium tin oxide (ITO) layer of about 200 nm thick. The whole was glued to a glass of 3 mm thick and then measured.

Figure 3:
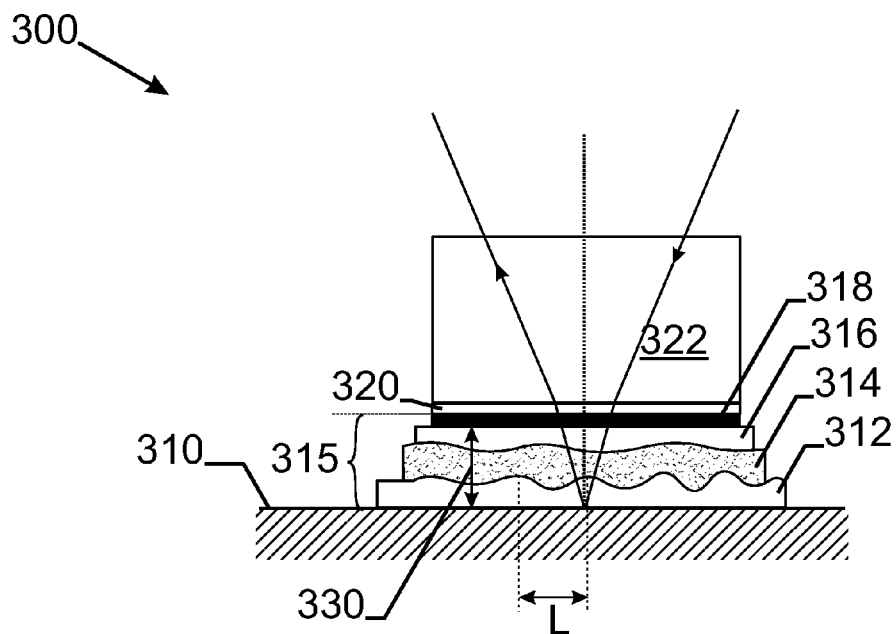
FIG. 3 shows a first embodiment of the inventive mirror stack

FIG. 3 illustrates a first preferred embodiment of the invention. The last two digits correspond with identical elements of FIG. 1. Again the mirror stack 300 is built on a reflector 310 and the stack 315 consists of a first electrochromic layer 312 on top of which an ion conductor 314 and a second electrochromic layer 316 are laid down, again finished with a transparent conductive electrode 318 that is glued by means of adhesive layer 320 to a glass pane 322. The variation in optical length 330 is obtained by a variation in thickness of the first electrochromic layer 312 due to patterning of that layer. The feature size of the patterning is represented by 'L'. Note that due to the conformal covering of the first electrochromic layer with the ion conductor, the interface between ion conductor 314 and second electrochromic layer 316 is flatter compared to the first electrochromic electrode 312 to ion conductor 314 interface. This does not give problems on itself: it is the total optical thickness that must vary, not necessarily the total thickness.

In a second preferred embodiment (not shown) an identical stack as described in FIG. 1 was made i.e.:

A W—Ni alloy reflective layer was deposited on a stainless steel foil.

Thereon a tungsten oxide film was deposited (thickness 't' is 380 nm refractive index 'n' is about 2)

Followed by the deposition of an silicon oxide ion conductor ('t' is 10 nm, 'n' is 1.46)

Followed by the deposition of a tungsten nickel oxide film ('t' is 180 nm, 'n' is about 2)

And finalised with a transparent conductive ITO layer ('t' is 200 nm, 'n' is about 2).

Figure 4:
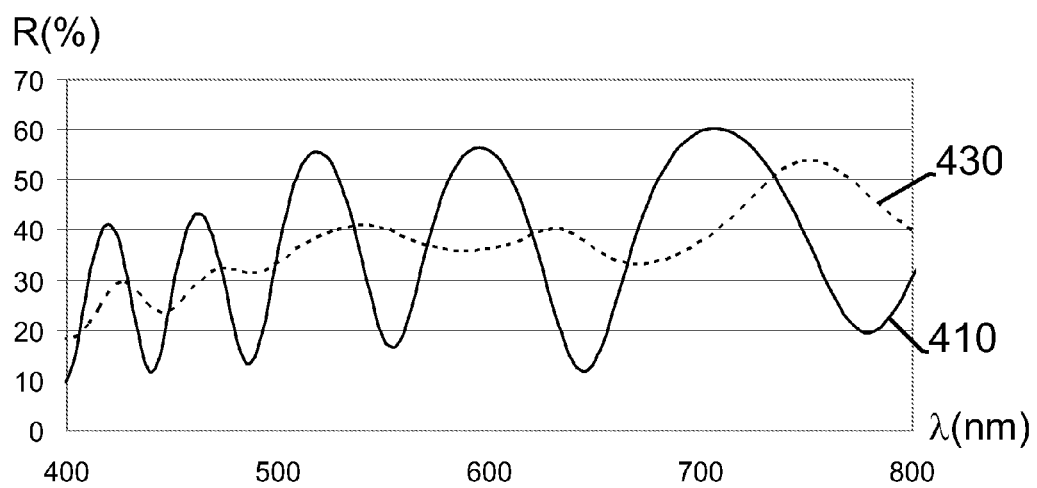
FIG. 4 shows the reflectogram of a second embodiment of the inventive mirror stack together with the reflectogram of the a prior-art device.

However, an additional optical layer of tungsten oxide was deposited through a steel wire mesh with a mesh size of 400 micron with wires of 250 micron on top of the ITO layer. This resulted in a varying thickness of the tungsten oxide layer between 0 and 75 nm in a pattern according to FIG. 5*a*. The only function of this layer is optical. The unit cell of the pattern is a square with a side of 920 micron. When now the reflectance in the bleached state is measured one obtains a smoothly varying curve as represented by 430 in FIG. 4. When scanning through the wavelength and measuring the reflectance the curve after having reached a local maximum never drops by more than 10% reflectance to the local minimum that follows in the visual region from 450 up to 650 nm. Outside the patterned region, the curve 410 was obtained. As a consequence the mirror stack is much more colour neutral than the mirror without patterning. To the human eye, the patterning is invisible and a true reflection of the objects without distortion is obtained.

Alternatively, the patterning can also be done in the second electrochromic electrode 316 or in the transparent conductive layer 318. In order to have enough variation in thickness, the layer must have an average optical thickness of at least half the design wavelength. Therefore silicon oxide is not the best choice for the ion conductor (as it is necessarily rather thin due to its low ion conductivity, typically 5 to 20 nm) but lithium oxy nitride (LiPON) is a better choice as this ion conductor can be easily 100 to 300 nm thick with still sufficient ion conductivity.

The patterning of the tungsten oxide layer is shown in FIG. 5a. The hatched regions 510 represent areas of minimum thickness, while the grey areas 515 are regions of maximum thickness. In between there is a contiguous area 520 of intermediate thickness (represented dotted). The imprint of the woven wire mesh is clear. The repetition of one square unit cell of $L_1 \times L_2 (L_1=L_2=920$ micron) covers the whole plane in a regular tessellation.

Figure 5B:
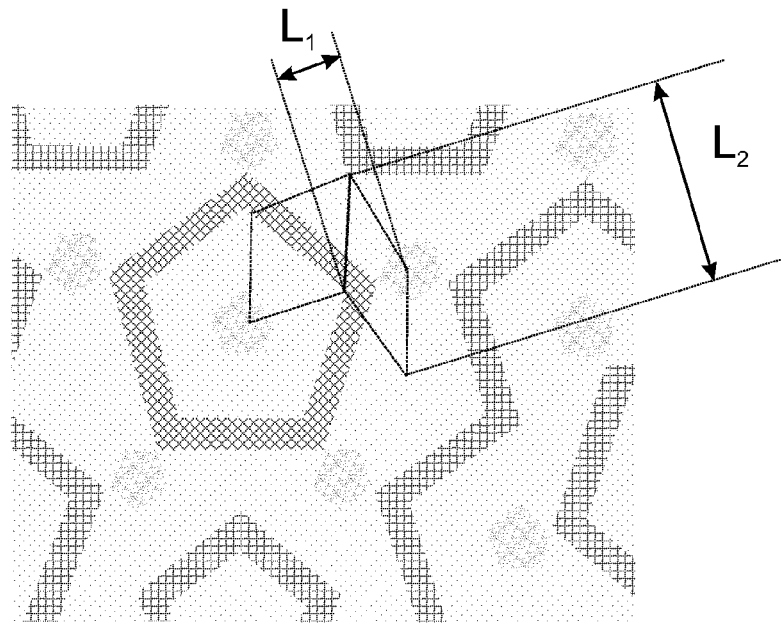
Figure 5C:
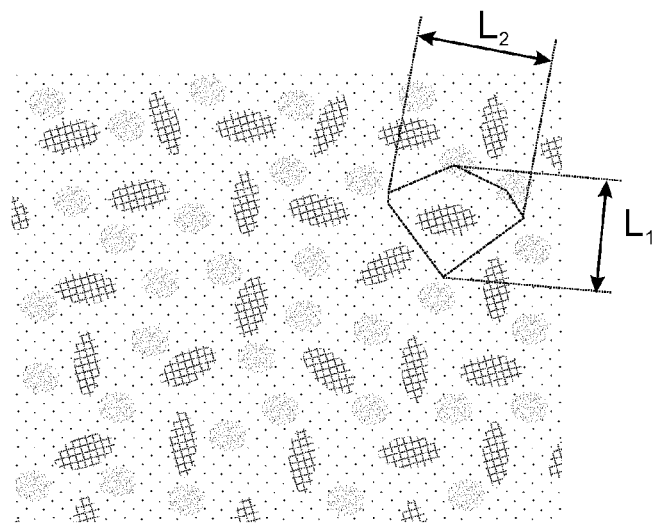

The patterning can alternatively be a non-repetitive tessellation based on for example the two Penrose diamonds of U.S. Pat. No. 4,133,152 as represented in FIG. 5b. The minimum and maximum feature sizes $L_1$ and $L_2$ must then both lie between 1 to 950 micron. Alternatively, the tessellation can be made in a random fashion as is illustrated in FIG. 5c. The minimum $L_1$ and maximum $L_2$ feature sizes are then the distance between two parallel lines that can hold the extremes of any Voronoi cell.

Alternatively, according a second preferred embodiment as depicted in FIG. 6 the mirror stack 615 can consist of a reflective surface 610 acting as a first conductive layer, whereon a first electrochromic electrode 612 is deposited, followed by the ion conductor 614, second electrochromic electrode 616, the transparent conductive layer 618. Different is the incorporation of an additional optical layer 624 that shows a variation of optical density in a pattern with feature size 'L'. This can e.g. be obtained by a wet coated layer that is UV irradiated resulting in fully cross linked transparent regions and not-fully crosslinked regions that have different refractive indices.

FIG. 7 shows the six possible arrangements in which the inventive mirror stack can be built up on a substrate 622. 'RL' stands for 'Reflective Layer', 'ED' for 'Electrochromic Device' and 'OL' is the optional 'Optical Layer'. In the three arrangements to the left (a, b, c) the substrate is not necessarily transparent and the view direction is from the top. In the three arrangements to the right (d, e, f) the substrate must be transparent as the reflector is put on top of the stack and the view direction is from below.

The invention claimed is:

1. An electrochromic mirror stack comprising a reflective surface for reflecting light, a layered electrochromic device parallel therewith variable between a colored and a bleached state, said device comprising a functional stack of at least an ion conductor layer, two electrochromic layers in contact with said ion conductor layer and one or two transparent conductive layers in contact with either one or both of said electrochromic layers, and an optical layer parallel with said reflective surface,
   wherein at least one of the layers in the functional stack has a pattern made up of identifiable features and
   wherein the total local optical length of said layers in the functional stack along a normal to said reflective surface varies in a plane perpendicular to said normal in the pattern of which feature sizes along the principal axes of said pattern are larger than 1 micron and smaller than 950 micron so as to average out the interference of the light that occurs when the light striking the mirror stack is reflected such that a reflectogram scan taken over a spot with a diameter substantially larger than said feature sizes in a wavelength range starting from 450 up to 650 nm has differences between any local maximum and its subsequent local minimum of less than 15% of reflectance when said electrochromic device is in the bleached state.

2. The mirror stack according to claim 1, wherein said feature sizes are larger than 1 micron and smaller than 500 micron.

3. The mirror stack according to claim 1, wherein all of the layers of said electrochromic device are solid state layers with a maximum total optical length that is less than 100 micrometer.

4. The mirror stack according to claim 1, wherein said electrochromic device is lithium based.

5. The mirror stack according to claim 1, wherein the range in said local optical length over said pattern is larger than one and smaller than fifteen times the quarter of a selected design wavelength.

6. The mirror stack according to claim 5 wherein said design wavelength is 550 nanometer.

7. The mirror stack according to claim 1 wherein a variation in said local optical length is due to a variation in thickness of at least one layer in said electrochromic device.

8. The mirror stack according to claim 1, wherein a variation in said local optical length is due to a variation in the optical length of said optical layer.

9. The mirror stack according to claim 8 wherein said optical layer is thinner than 1000 nm but thicker than 50 nm.

10. The mirror stack according to claim 8 wherein said variation in said local optical length is in the thickness of said optical layer, or in the refractive index of said optical layer, or in both.

11. The mirror stack according to claim 1, wherein said pattern comprises cells, and where the minimum and maximum size of said cells is between 1 to 950 micron.

12. The mirror stack according to claim 11, wherein said pattern is a tessellation with a finite number of unit cells.

13. The mirror stack according to claim 12 wherein said tessellation comprises two unit cells.

14. The mirror stack according to claim 12, wherein said tessellation is regular with a single unit cell.

15. The mirror stack according to claim 1, wherein the mirror stack is produced by a method comprising the steps of:
   a. Providing the reflective surface;
   b. Depositing over said reflective surface the functional electrochromic stack comprising the ion conductor layer, said two electrochromic layers and said one or two transparent conductive layers;
   wherein at least one of said layers is patterned in a direction perpendicular to the normal on said reflective surface, and
   wherein said pattern has said feature size of between 1 and 500 micron.

16. The mirror stack according claim 15 wherein the step of providing a said reflective surface is followed by a deposition of an optical layer on said reflective surface, followed by the deposition of said functional electrochromic stack on said optical layer.

17. The mirror stack according claim 15 in which a first step in the method is the depositing of said functional electrochromic stack, followed by a deposition of said optical layer on said functional electrochromic stack, followed by the providing of said reflective surface on said functional electrochromic stack.

18. The mirror stack according to claim 15 wherein said optical layer is first deposited, followed by the deposition of said functional electrochromic stack, followed by the providing of said reflective surface on said functional electrochromic stack.

19. The mirror stack according to claim 15 wherein the method to pattern the patterned layer is an additive method.

20. The mirror stack according to claim 19 wherein said additive method is one out of a group comprising deposition through a mask, said mask being a mechanical or fluid based or photolithographic applied mask, or deposition by printing through a screen or by transfer or by jet, or deposition by wet coating.

21. The mirror stack according to claim 15 wherein the method to pattern the patterned layer is a subtractive method.

22. The mirror stack according to claim 21 wherein said subtractive method is one out of a group comprising chemical or plasma etching through a mask, selective laser ablation, mechanical scribing.

23. An electrochromic mirror stack comprising:
a reflective surface for reflecting light;
a layered electrochromic device parallel therewith variable between a colored and a bleached state, said device comprising a functional stack of at least an ion conductor layer, two electrochromic layers in contact with said ion conductor layer and one or two transparent conductive layers in contact with either one or both of said electrochromic layers; and
an optical layer parallel with said reflective surface,
wherein the optical layer has a pattern made up of features and wherein the total local optical length of said layers along a normal to said reflective surface varies in a plane perpendicular to said normal in the pattern of which feature sizes along the principal axes of said pattern are larger than 1 micron and smaller than 950 micron so as to average out an interference of the light that occurs when the light striking the mirror stack is reflected such that a reflectogram scan taken over a spot with a diameter substantially larger than said feature sizes in a wavelength range starting from 450 up to 650 nm has differences between any local maximum and its subsequent local minimum of less than 15% of reflectance when said electrochromic device is in the bleached state;
wherein the variation in said local optical length is due to a variation in the optical length of said optical layer;
wherein the variation in said optical length is due to a variation in the thickness of said optical layer, or in the refractive index of said optical layer, or in both; and
wherein said variation in the refractive index or thickness is obtained by varying the material composition on a length scale of said feature sizes.

24. An electrochromic mirror stack comprising:
a reflective surface for reflecting light;
a functional layer stack including an ion conductor layer, a plurality of electrochromic layers, and
one or more transparent conductive layers in contact with either one or both of said electrochromic layers;
wherein at least one of the layers in the functional layer stack is a patterned layer, the pattern being formed by identifiable features formed in the layer, the presence of said features resulting in a variation in the total optical length of the functional layer stack for portion of the stack where light passes through said features as compared to portions of the stack in which light does not pass through said features; and
wherein the sizes of the features along the principal axes of the pattern are larger than 1 micron and smaller than 950 micron so as to average out an interference of the light that occurs when the light striking the mirror stack is reflected and prevent resulting iridescence from being observed when viewing light reflected from the reflective surface and passing through the layers.

25. The electrochromic mirror stack of claim 24 in which a reflectogram scan taken over a spot with a diameter larger than said feature sizes in a wavelength range starting from 450 up to 650 nm has differences between any local maximum and its subsequent local minimum of less than 15% of reflectance when said electrochromic device is in the bleached state.

26. The electrochromic mirror stack of claim 24 in which the functional layer stack further comprises an optical layer.

27. The electrochromic mirror stack of claim 26 in which the optical layer is formed on the reflective surface and between the functional layer stack and the reflective surface.

28. The electrochromic mirror stack of claim 26 in which the optical layer is formed on top of the functional layer stack and opposite to the reflective surface from the functional layer stack.

29. The electrochromic mirror stack of claim 26 wherein the variation in said optical length is due to a variation in refractive index of the optical layer obtained by varying the material composition of the optical layer on a length scale of said feature sizes.

30. The electrochromic mirror stack of claim 24 in which the sizes of the features along the principal axes of the pattern are larger than 1 micron and smaller than 500 microns.

31. The electrochromic mirror stack of claim 24 wherein the variation in said optical length is due to a variation in thickness of at least one layer in said functional layer stack.

* * * * *

UNITED STATES PATENT AND TRADEMARK OFFICE
CERTIFICATE OF CORRECTION

PATENT NO. : 8,416,486 B2
APPLICATION NO. : 12/922757
DATED : April 9, 2013
INVENTOR(S) : Edy Widjaja et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 173 days.

Signed and Sealed this
Twenty-eighth Day of January, 2014

Michelle K. Lee
*Deputy Director of the United States Patent and Trademark Office*